United States Patent
Halmi

[11] 3,733,901
[45] May 22, 1973

[54] FLOW METERING DEVICE OF THE PRESSURE DIFFERENTIAL PRODUCING TYPE

[75] Inventor: Dezsoe Halmi, Cranston, R.I.

[73] Assignee: General Signal Corporation, Rochester, N.Y.

[22] Filed: Aug. 9, 1972

[21] Appl. No.: 279,153

Related U.S. Application Data

[63] Continuation-in-part of Ser. No. 144,899, May 19, 1971, abandoned.

[52] U.S. Cl. ........................................73/213, 138/44
[51] Int. Cl. ................................................G01f 1/00
[58] Field of Search ...........................73/213; 138/44

[56] References Cited

UNITED STATES PATENTS

| | | | |
|---|---|---|---|
| 1,850,030 | 3/1932 | Pardoe | 73/213 |
| 2,704,555 | 3/1955 | Dall | 138/44 |
| 2,868,013 | 1/1959 | Terrell | 73/213 |

OTHER PUBLICATIONS

R. G. West, Rectangular Tube Design, Instrument Practice, Dec. 1961, P. 1547–1552.

*Primary Examiner*—Richard C. Queisser
*Assistant Examiner*—John P. Beauchamp
*Attorney*—Jeffrey S. Mednick et al.

[57] ABSTRACT

The disclosure concerns fluid flow metering devices of the differential pressure producing type comprising a tube of polygonal, preferably rectangular, cross section which defines a converging section which guides the fluid to a throat. The throat has a pressure tap located to sense true static pressure, and the converging section accelerates the fluid over a distance that is from approximately $2.7 \sqrt{A_I} (1-B)$ to approximately $3.1 \sqrt{A_I} (1-B)$, where $A_I$ is the cross sectional area of the inlet of the tube, and B is the ratio of the square roots of the cross sectional areas of the throat and the inlet. This flow metering device affords a discharge coefficient comparable to that of the classical or Herschel Venturi, and a "2 sigma" accuracy of ±1 percent.

7 Claims, 3 Drawing Figures

PATENTED MAY 22 1973 3,733,901

INVENTOR
DEZSOE HALMI

BY Dodge & Ostmann
ATTORNEYS

3,733,901

FLOW METERING DEVICE OF THE PRESSURE DIFFERENTIAL PRODUCING TYPE

CROSS-REFERENCE TO RELATED APPLICATION

This application is a continuation-in-part of U.S. application, Ser. No. 144,899, filed May 19, 1971, now abandoned.

BACKGROUND AND SUMMARY OF THE INVENTION

A common flow meter of the differential pressure producing type comprises a tube having a large inlet section which is joined to a throat of reduced area by a converging section, and a pair of pressure taps for sensing the static pressures in the inlet and throat sections. Perhaps the best known instrument of this type is the Herschel or classical Venturi (see "Fluid Meters," 5th Edition, 1959, American Society of Mechanical Engineers), which is noted for its large and stable discharge coefficient and its small "2 sigma" accuracy tolerance. This meter, however, has a circular cross section, so its incorporation in a fluid handling system employing polygonal ducts requires use of transition duct sections. In most cases, this requirement is intolerable because the transition sections are complex and expensive, consume considerable space, and, unless very carefully designed, introduce flow pattern abnormalities which adversely affect the performance of the meter.

Although there is a need for a rectangular differential producer, the prior art furnishes little information regarding the design and performance of such an instrument. In fact, as far as I am aware, the following works are the only pertinent ones which have been published:

"Rectangular Tube Design — Part I" by R.G. West, Instrument Practice, December, 1961, pages 1547-1552.

"Shell Flow Meter Engineering Handbook," pages 109-111, Waltman Publishing Company, Delft, The Netherlands, 1968.

These articles, which evidently are based upon the same studies, indicate that known rectangular meters have unpredictable discharge coefficients, and may not be assigned a "2 sigma" accuracy tolerance of less than ±5 percent. These disappointing results justify the consensus of experts in the art that use of rectangular differential producers should be avoided.

The object of this invention is to provide an improved polygonal differential producer which affords performance characteristics comparable to those of the classical Venturi. According to the invention, the new meter is constructed from planar walls and is distinguished by:

a. a converging section which accelerates the fluid to throat velocity and has a length between approximately 2.7 $\sqrt{A_I}(1-B)$ and 3.1 $\sqrt{A_I}(1-B)$, where $A_I$ is the cross sectional area of the tube inlet, and B is the Beta ratio of the tube, i.e., the ratio of the square roots of the cross sectional areas of the throat and the inlet; and b. by a throat which contains a pressure tap positioned to sense true static pressure at a point where flow is attached to the throat wall, and which preferably is located in a tube wall having an upstream portion which changes flow direction.

The performances of the new meters match so closely those of classical Venturi tubes having the same inlet area and Beta ratio that they may legitimately be assigned a small uncalibrated accuracy tolerance on the basis of the statistical data from which the tolerance level of the classical Venturi was derived. Specifically, actual tests indicate that the above described flow metering device affords a discharge coefficient of 0.98 over the Beta range of 0.3 to 0.75, and has a "2 sigma" uncalibrated accuracy tolerance of ±1 percent. In addition, the new meter possesses the other known advantages of the classical Venturi, such as a "quiet" or non-pulsating differential, a discharge coefficient which is relatively insensitive to changes in Reynolds number, Beta ratio, line size, and the velocity distribution in the flowing stream, and an adiabatic expansion factor which is capable of accurate calculation. Finally, since this instrument includes no curved internal surfaces, it avoids the expensive machining operations which characterize manufacture of the classical Venturi and makes easier the task of assigning reliable calibrated accuracy tolerances to particular tubes based on measured dimensions.

BRIEF DESCRIPTION OF THE DRAWING

The preferred embodiment of the invention is described herein in detail with reference to the accompanying drawing in which.

DESCRIPTION OF PREFERRED EMBODIMENT

Figure 3:
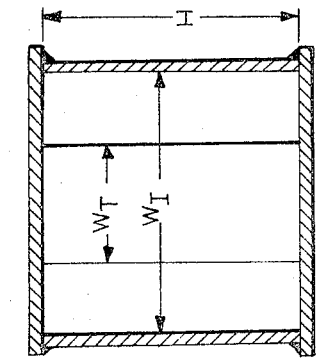
FIGS. 2 and 3 are sectional views taken on lines 2—2 and 3—3, respectively, of FIG. 1.
Figure 1:
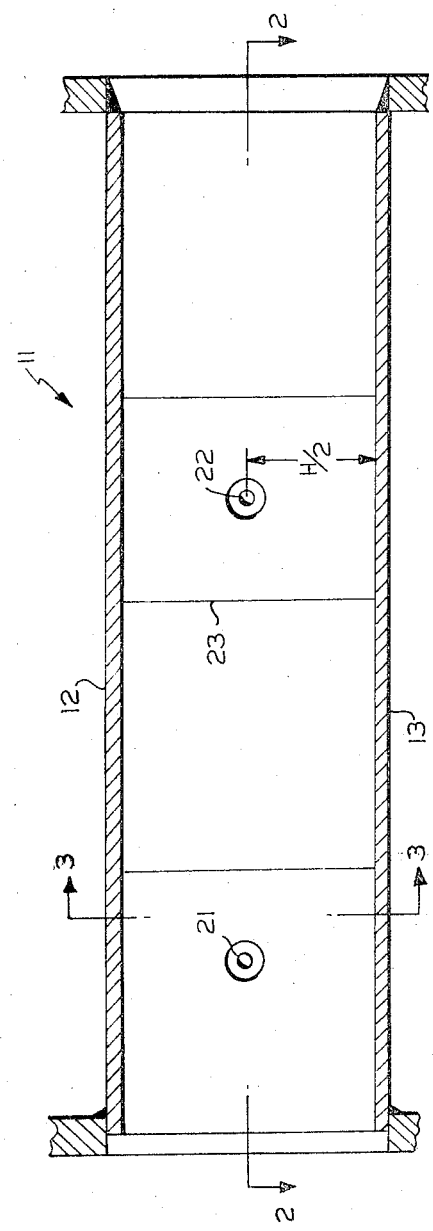
FIG. 1 is an axial sectional view of the improved rectangular differential producer.
Figure 2:
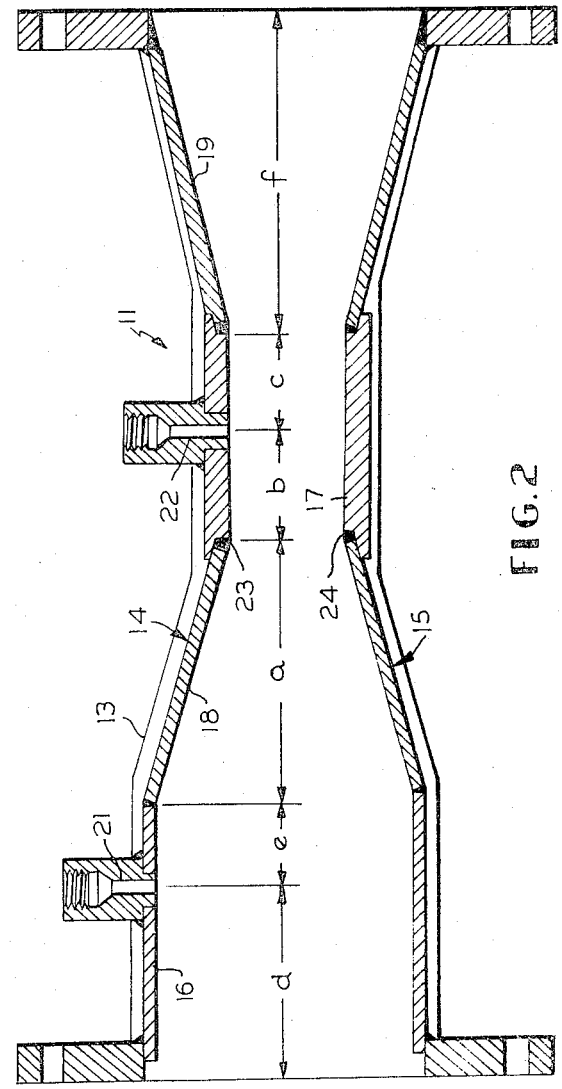

As shown in the drawing, the invention is embodied in a flange ended tube 11 comprising flat, parallel top and bottom walls 12 and 13, respectively, and a pair of identical side walls 14 and 15, each of which is composed of flat plates. These walls are welded together to form a duct of polygonal, preferably rectangular, cross section which includes an inlet section 16 of constant cross sectional area, a throat 17 of constant, but smaller area, an interconnecting converging section 18, and a diffuser section 19. The design of the diffuser forms no part of the invention itself and may even be omitted in cases where good head recovery is not desired. The inlet and throat sections 16 and 17 are provided with static pressure taps 21 and 22, respectively, which furnish to the secondary portion (not shown) of the complete flow meter the pressures from which the rate of flow is derived. These taps are constructed in the conventional manner.

The axial length a of converging section 18 should be between approximately 2.7 $\sqrt{A_I}(1-B)$ and approximately 3.1 $\sqrt{A_I}(1-B)$, where $A_I$ is the cross sectional area of inlet section 16, and B is the ratio of the square roots of the cross sectional areas of throat 17 and inlet 16, for a "2 sigma" accuracy of ±1 percent. As long as the axial length a is maintained between approximately 1.4 $\sqrt{A_I}(1-B)$ and approximately 5.6 $\sqrt{A_I}(1-B)$, a "2 sigma" accuracy within ±5 percent will be achieved.

The side walls 14 and 15 form corners 23 and 24, which may be sharp, at the junction between the converging and throat sections 18 and 17, respectively. These corners cause the fluid flowing through tube 11 to form a vena contracta at the throat entrance. This jet has the advantageous effect of normalizing the flow pattern (i.e., the velocity distribution across the flowing stream), and thereby tends to make the discharge coefficient of the tube insensitive to the condition and design of the upstream ducting. However, since formation of the vena contracta causes the fluid to separate from the tube walls, the throat tap 22 must be carefully positioned to insure that it senses true static pressure. In other words, the axial spacing between the throat entrance and the tap must be sufficient to insure that the flow has reattached to the throat wall before it passes the tap. A spacing $b$ of between approximately $B\sqrt{A_I}$ and approximately $1.25B\sqrt{A_I}$, where B is the Beta ratio of the tube and $A_I$ is the cross section area of the tube inlet, yields a "2 sigma" accuracy of ±1 percent. A spacing $b$ of between approximately $0.9B\sqrt{A_I}$ and $2.5B\sqrt{A_I}$ yields a "2 sigma" accuracy within ±5 percent.

Throat tap 22 preferably is located in a tube wall which has a portion upstream of throat 17 which changes flow direction, and is positioned midway between the side edges of that wall. Thus, in the illustrated embodiment, this tap is located in side wall 14 and is spaced a distance of H/2 from each of the top and bottom walls 12 and 13. In addition, the tap should be spaced axially a sufficient distance from the diffuser entrance to insure that the pressure it senses is not affected by back effects from the diffuser. Experience indicates that a spacing $c$ equal to dimension $b$ is adequate. The foregoing arrangement of the throat tap affords the closest correspondence between the discharge coefficients of the tube 11 and the classical Venturi, and also minimizes pulsations in the sensed pressure.

The inlet tap 21 also is intended to sense true static pressure, and therefore it should be positioned so as to minimize the adverse influence of converging section 18, the junction between the inlet end of tube 11 and the upstream ducting, and the corners defined by the intersections of the walls 12–15. This goal is achieved by locating the tap in one of the side walls 14 and 15 midway between the top and bottom walls, by providing a spacing $d$ of between approximately 1 inch and approximately 12 inches between the tap and the tube entrance, and by providing a spacing $e$ from approximately $0.28\sqrt{A_I}$ and approximately $0.56\sqrt{A_I}$ between the tap and the upstream end of converging section 18 for a "2 sigma" accuracy of ±1%. If spacing $e$ is maintained between approximately $0.14\sqrt{A_I}$ and approximately $2.0\sqrt{A_I}$, a "2 sigma" accuracy within ±5 percent will be achieved.

Although, as mentioned earlier, inclusion of diffuser 19 is not essential, it is used in all high quality instruments. For optimum head recovery, axial length $f$ should not exceed $8.6(\sqrt{A_I}-\sqrt{A_T})$, where $A_I$ and $A_T$ are the cross sectional areas of inlet and throat sections 16 and 17, respectively.

The cross sectional shape of tube 11 is selected to suit the shape of the ducting system in which it is inserted, but, at any station along its length, it should always have an even number of sides, opposed sides of equal length, and equal corner angles. In the case of a rectangular section, which is the normal shape, the ratio of the length of the sides can be between 10:1 and 1:1, provided that neither width nor height is less than 1 inch. It is immaterial, as far as performance is concerned, that tube cross section changes from an oblong at the inlet to a square at the throat or vice versa, or that the inlet and throat sections are oblongs whose major dimensions are not aligned. Moreover, except for the matter of increased cost of manufacture, it makes no difference whether two or all four of the walls 12–15 are shaped. However, close correspondence between the discharge coefficients of the new tube and the classical Venturi requires that all cross sections along the length of tube 11 be symmetrical about the same set of perpendicular axes (e.g. the horizontal and vertical axes in the illustrated embodiment). In other words, opposing tube walls 12 and 13 or 14 and 15 must be identical.

The performance of the new differential producer is insensitive to its orientation in space. However, if illustrated tube 11, which has only two shaped walls, is installed in a horizontal duct, it is recommended that it be so oriented that the parallel walls 12 and 13 lie in horizontal planes. This arrangement encourages self-scouring, i.e., it prevents accumulation in converging section 18 of foreign material which may settle from the flowing fluid medium.

While there has been described what is at present considered to be the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A flow metering device of the differential pressure producing type comprising:
   a. a tube of polygonal cross section which defines a throat and a converging section for guiding fluid thereto from an inlet region of larger cross section,
   b. the converging section comprising at least one pair of opposed, planar, converging walls which intersect throat-defining walls, and having a length between approximately $1.4\sqrt{A_I}(1-B)$ and approximately $5.6\sqrt{A_I}(1-B)$, where $A_I$ is the cross sectional area of the inlet region and B is the ratio of the square roots of the cross sectional areas of the throat and the inlet region; and
   c. a pressure tap in a throat-defining wall located so as to sense true static pressure at a point where flow is attached to that wall.

2. A flow metering device as defined in claim 1 in which said pressure tap is located in the center of one said parallel, throat-defining walls which intersect the converging walls.

3. A flow metering device as defined in claim 1 in which said converging section has an axial length between approximately $2.7\sqrt{A_I}(1-B)$ and approximately $3.1\sqrt{A_I}(1-B)$.

4. A flow metering device as defined in claim 3 in which
   a. the tube also has an inlet section which is joined to the throat by said converging section and which includes parallel, planar walls which intersect said pair of converging walls; and
   b. one of said parallel walls of the inlet section contains another pressure tap positioned to sense true static pressure.

5. A flow metering device as defined in claim 4 in which
   a. said another pressure tap in the inlet section is spaced axially from the intersection of the inlet and converging walls a distance of from approximately $0.28\sqrt{A_I}$ to approximately $0.56\sqrt{A_I}$ and is located midway between the side edges of said wall of the inlet section; and b. the pressure tap in the throat is located in the center of one of said parallel throat-defining walls which intersect the converging walls.

6. A flow metering device as defined in claim 5 in which a. the tube also defines a diffuser at the downstream end of the throat, b. the diffuser having an axial length up to approximately 8.6 ($\sqrt{A_I} - \sqrt{A_T}$), where $A_I$ and $A_T$ are the cross sectional areas of the inlet section and the throat, respectively.

7. A flow metering device as defined in claim 6 in which the tube has a rectangular cross section.

* * * * *